(12) United States Patent
Misra

(10) Patent No.: US 7,504,130 B1
(45) Date of Patent: Mar. 17, 2009

(54) PREPARATION OF TITANIA COATED NICKEL FERRITE NANOPARTICLES

(75) Inventor: Devesh Kumar Misra, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 802 days.

(21) Appl. No.: 11/051,273

(22) Filed: Feb. 4, 2005

(51) Int. Cl.
*B05D 7/00* (2006.01)

(52) U.S. Cl. .............. 427/212; 427/213.3; 427/213.31; 427/214

(58) Field of Classification Search .............. 427/213.3, 427/214, 127
See application file for complete search history.

(56) References Cited

U.S. PATENT DOCUMENTS

| | | | |
|---|---|---|---|
| 4,933,404 A | 6/1990 | Beckman et al. | |
| 5,238,671 A | 8/1993 | Matson et al. | |
| 5,770,172 A | 6/1998 | Linehan et al. | |
| 2002/0110519 A1 | 8/2002 | Ying et al. | |
| 2004/0009117 A1 | 1/2004 | Lewis et al. | |
| 2004/0115124 A1 | 6/2004 | Woo et al. | |

OTHER PUBLICATIONS

Kale et al., "Magnetic Behavior of Nanocrystalline Nickel Ferrite Synthesized by the Reverse Micelle Technique," J. Magnetism and Magnetic Mat., 277, pp. 350-358, 2004.*

Chi Tay Tsai, et al; "Anti-Microbial Nanoparticles Composed of a Magnetic Core and Covered with Photocatalystic TiO2"; FAU Office of Technology Transfer; Nov. 2004.

Kale, et al; "Superparamagnetic Behaviour of Nanocrystalline Ni-Zn, Zn-Mn and Ni-Mn Ferrites Processed by Reverse Micelle Method"; Materials Sci. & Tech. 2004, 20, p. 999-1005.

Misra, et al; "Synthesis of Nanocrystalline Nickel and Zinc Ferrites by Microemulsion Technique"; Materials Sci. & Tech. 2003, 19, p. 826-830.

Pileni; "Reverse Micelles as Microreactors"; J. Phys. Chem. 1993, 97, p. 6961-6973.

Hsu, et al; "Reverse Micelles Enable Strong Electrostatic Interactions of Colloidal Particles in Nonpolar Solvents"; Dept. of Physics; Harvard U., 2004.

"Photocatalytic Oxidation" Article; POC Homepage; http://www.ntu.edu.sg/cwp/pco; 2004.

"Titanium Dioxide—Titania" Article; Azom.com; http://www.azom.com/details.asp?ArticleID=1179; 2004.

Gollwitzer, et al; "Titania Coating as a Local 'Drug' Delivery System with Antibacterial and Biocompatible Properties" Article.

* cited by examiner

*Primary Examiner*—Michael Cleveland
*Assistant Examiner*—Robert Vetere
(74) *Attorney, Agent, or Firm*—Henry E. Naylor; Kean, Miller, Hawthorne, D'Armond, McCowan & Jarman LLP

(57) ABSTRACT

A method for preparing composite nanoparticles comprised of a nickel ferrite core having a photocatalytic shell comprised of titania. The method is a combined reverse micelle plus chemical precipitation method that can be controlled to produce nanoparticles having a substantially uniform size and spherical shape.

22 Claims, 3 Drawing Sheets

PREPARATION OF TITANIA COATED NICKEL FERRITE NANOPARTICLES

FIELD OF THE INVENTION

The present invention relates to a method for preparing composite nanoparticles comprised of a nickel ferrite core having a photocatalytic shell comprised of titania. The method is a combined reverse micelle plus chemical precipitation method that can be controlled to produce nanoparticles having a substantially uniform size and spherical shape.

BACKGROUND OF THE INVENTION

Titania is one of the world's most demanded chemicals because of the high versatility of its uses. For example, it is used in such things as paints, coatings, sunscreens, glass, synthetic fibers, paper, implants for humans, and as a germicidal agent for the treatment of wounds. In recent years, nanocrystalline titania has attracted significant attention because of its photocatalytic property in applications such as: the removal of organic and inorganic pollutants from air and water; the killing of bacteria; a photovoltaic material for harvesting solar energy; in the photoreduction of nitrogen and carbon dioxide; and as a dielectric material for ultra thin capacitors. While titania is sometimes sprayed on wounds in order to decrease infection, it cannot be extracted with the use of a magnetic field because it is an insulator. It is generally known that composite particles can be formed comprised of a magnetic core with a titania outer layer to aid its extraction when used in such uses as the treatment of wounds. Ma et. al., Synthesis and Characterization of Titania-Coated Mn—Zn Ferrite Nanoparticles; Colloids and Surfaces A: Physicochem. Eng. Aspects 224 (2003) 207-212 teaches a core-shell structured composite comprised of titania coated Mn—Zn ferrite nanoparticles.

U.S. Pat. No. 5,770,172 discloses a process for forming nano-sized metal compounds using reverse micelle or reverse microemulsion systems. The nano-sized metal, preferably Fe-compounds, are produced for use as catalysts for the conversion of coal to liquid and gaseous products.

While the art teaches titania shell/magnetic core nanoparticles and their preparation, there is still a need in the art for more efficient and economical methods for preparing such compositions. There is also a need in the art for titania shell/magnetic core composite nanoparticles having improved magnetic properties.

SUMMARY OF THE INVENTION

In accordance with the present invention there is provided a method for producing composite nanoparticles comprised of a nickel ferrite core surrounded by an outer layer of titania, which method comprising:

a) dissolving an effective amount of a surfactant into a non-polar organic solvent and providing sufficient mixing to cause the formation of a reverse micelle microemulsion;

b) dividing said reverse micelle microemulsion into a first fraction and a second fraction;

c) blending into said first fraction an aqueous solution having dissolved therein: i) a water soluble nickel salt; and ii) a water soluble iron salt, wherein the concentration of nickel salt and the concentration of iron salt are in at least stoichiometric amounts that will result in the formation of $NiFe_2O_4$, thereby forming a metal salt microemulsion comprised of reverse micelles in a continuous non-polar organic phase, which reverse micelles are comprised of an aqueous core of metal salt solution encased in a surfactant shell;

d) blending into said second fraction an effective amount of an aqueous precipitating agent solution, thereby resulting in the formation of a precipitating agent microemulsion comprised of reverse micelles in a continuous non-polar organic phase, which reverse micelles are comprised of an aqueous core of precipitating agent solution encased in a surfactant shell;

e) blending at least a portion of the metal salt microemulsion with at least a portion of the precipitating agent microemulsion; thereby resulting in the precipitation of nano-size particles of $NiFe_2O_4$ in the aqueous core of said reverse micelles, thus forming a $NiFe_2O_4$ microemulsion;

f) introducing into said $NiFe_2O_4$ reverse micelle microemulsion an effective amount of an aqueous acidic titanium salt solution;

g) heating said acidic titanium salt/$NiFe_2O_4$ microemulsion solution of step f) above at an effective temperature for an effective amount of time to form composite nanoparticles comprised of an inner core of $NiFe_2O_4$ having an outer layer comprised substantially of $TiO_2$;

h) extracting the composite nanoparticles from the non-polar solvent by adding an effective amount of a $C_2$ to a about a $C_6$ alcohol wherein the composite nanoparticles will migrate to the alcohol phase in the form of a colloidal dispersion;

i) separating the colloidal dispersion alcohol phase from the non-polar solvent phase;

j) centrifuging the colloidal dispersion alcohol phase to cause the composite nanoparticles to settle out of the alcohol phase; and k) collecting the composite nanoparticle product.

In a preferred embodiment, the surfactant is an anionic surfactant, preferably sodium-bis(2-ethylhexyl)sulfosuccinate and the non-polar organic solvent is isooctane.

In another preferred embodiment the precipitating agent is ammonium hydroxide.

In still another preferred embodiment the titanium salt of the acidic titanium salt solution is $TiCl_4$ and the acid is HCl.

In yet another preferred embodiment the titania is in the anatase form.

DETAILED DESCRIPTION OF THE INVENTION

Figure 1:
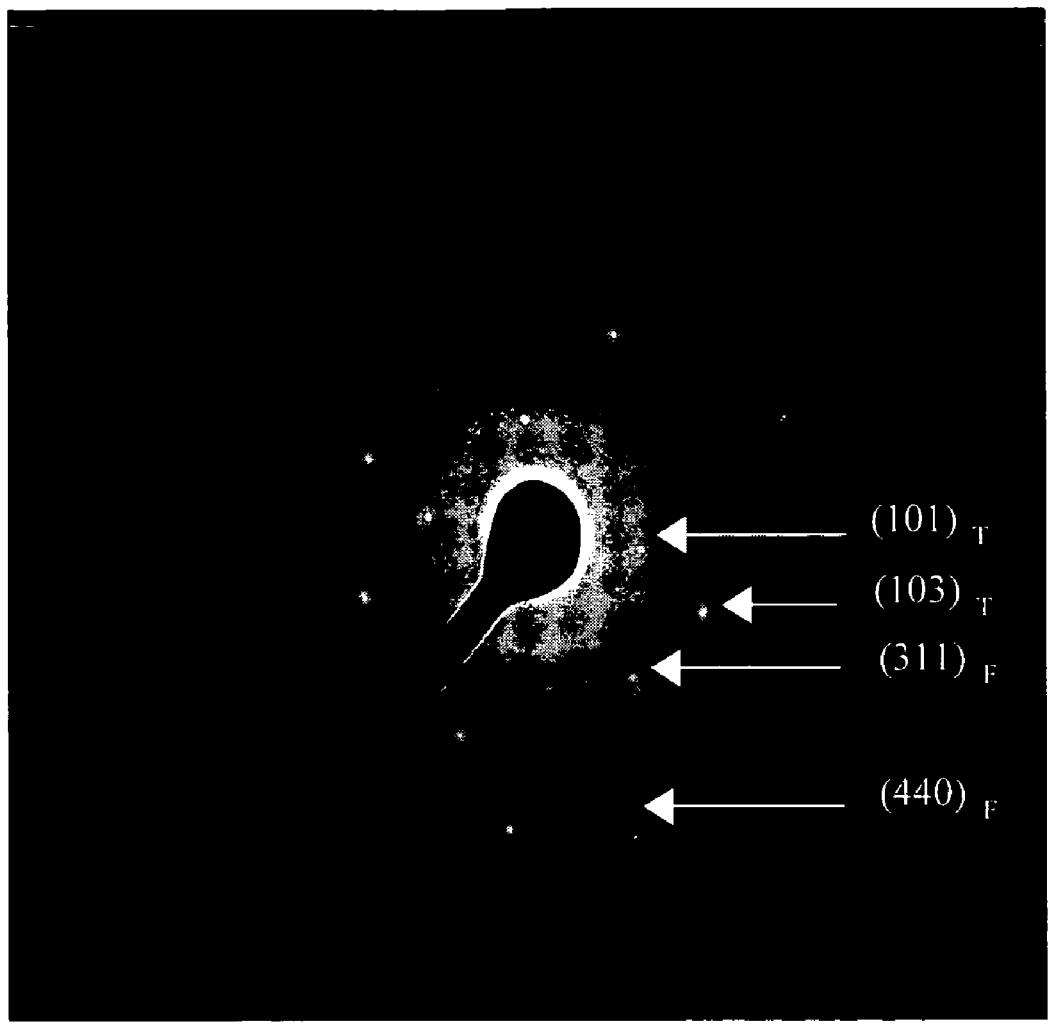
FIG. 1 hereof is an electron diffraction pattern obtained from a sample of the $TiO_2$/$NiFe_2O_4$ composite nanoparticles of the present invention.

The titania coated nickel ferrite composite nanoparticles of the present invention have superior properties when compared to conventional titania coated nanoparticles. For example, the coated nickel ferrite nanoparticles retain the characteristics of uncoated nanocrystalline nickel ferrite superparamagnetism and non-saturation of magnetic moments at high magnetic fields. Further, in biomedical applications, an iron oxide core material is undesirable because the iron oxide would be indistinguishable from that of hemoglobin. This will interfere with blood analysis. Also, the photocatalytic properties of the titania of the composite nanoparticles of the present invention can be exploited for antimicrobial, or germicidal, activity. The preferred mineral form of the titania of the present invention is the anatase form, although the rutile form, which is less effective, can also be used.

The composite nanoparticles of the present invention are prepared by a reverse micelle process. Reverse micelles and microemulsions are optically transparent, thermodynamically stable systems often containing dispersed aqueous droplets stabilized in a continuous nonpolar medium by surfactant shells. These aqueous droplets, also sometimes referred to as aqueous microdomains, or pools, within the micelle core (2 to 20 nanometers in diameter) have solvent properties that depend on such things as the molar water-to-surfactant ratio. At low molar water-to-surfactant ratio (<10), the water in the core is highly structured due to association with the polar head group of the surfactant molecules. At higher molar water-to-surfactant ratio the micelles become swollen with a free water core having bulk water solvent characteristics. Reverse micelles and microemulsions can, in some respects, be visualized as submicroscopic aqueous reaction vessels into which water soluble species can be dissolved and reacted.

Any suitable reverse micelle system can be used in the practice of the present invention. Such systems are typically nonionic, anionic, or cationic. The most preferred are the anionic systems and the more preferred anionic surfactants for producing such systems are sodium-bis(2-ethylhexyl)sulfosuccinate (AOT), di(1,3-dimethyl-butyl)-sulfosuccinate, and diamylsulfo-succinate. AOT is the most preferred. These surfactants are available commercially neat (dry) or in solution form (in alcohol or water) under the AEROSOL trademark of Cytec, Inc. of West Patterson, N.J. as AEROSOL-OT (AOT) or AEROSOL-GPG, AEROSOL-MA-80 (MA-80) and AEROSOL-AY (AY). If a cationic system is desired, then the most preferred cationic surfactant is didodecyldimethylammonium bromide (DDAB).

A co-surfactant can also be used to facilitate the formation and stability of the reverse micelle microemulsion system. Co-surfactants, as well as the primary surfactants, will have a carbon number from about 8 to 20. Sodium alkyl sulfates are preferred, more preferred is SDS (sodium dodecyl sulfate).

The process of the present invention is generally practiced by first forming a reverse micelle microemulsion wherein a suitable solid surfactant component, preferably an anionic surfactant component, is mixed with a suitable non-polar or low-polar organic solvent component. At least a fraction of the surfactant will dissolve in the non-polar solvent. The term "non-polar" is used herein to mean either a suitable non-polar solvent or a suitable low-polar solvent. Non-polar solvents are generally defined as solvents having a small dipole moment (preferably D<1) and a small dielectric constant (preferably e<5). The solvent portion typically comprises aromatic hydrocarbons such as toluene, butylbenzene, benzene; cycloalkanes such as cyclohexane; chlorinated hydrocarbons such as carbon tetrachloride and methylene chloride; and alkanes having up to 20 carbon atoms, and preferably up to 16 carbon atoms, such as hexane, octane, isooctane, decane, dodecane and hexadecane; and branched alkanes such as isooctane and dimethyl butane, or mixtures thereof. Preferred non-polar and low-polar solvents are the alkanes, with isooctane being the most preferred.

The two components are mixed with sufficient energy and for an effective amount of time to result in the formation of reverse micelles in a non-polar solvent continuous phase. When the surfactant is dissolved in the non-polar solvent, the hydrophobic end will tend to move to the surface of the solvent with the hydrophilic end protruding out of the solvent and in contact with air. When the surfactant concentration is increased to a level such that there are a large number of surfactant molecules on the surface of the non-polar solvent, these molecules will start forming reverse micelles, leading to a decrease in the surface tension. In the reverse micelle, the hydrophilic groups are in contact with each other and hence their interaction with the non-polar solvent molecules in minimized. The formation of reverse micelles continues with an increase in the surfactant concentration until a critical concentration is reached. After this point, the surface tension of the system becomes independent of the surfactant concentration, and only reverse micelles form. At this stage of the instant process, there is substantially no aqueous core within the reverse micelles.

The resulting reverse micelle in non-polar solvent microemulsion is preferably divided into a first fraction and a second fraction. It is preferred that the two fractions be substantially equal in volume. An effective amount of an aqueous solution containing a dissolved water soluble nickel salt and a dissolved water soluble iron salt is added to the first fraction. The ratio of nickel salt to iron salt will be in a ratio to provide at least a stoichiometric amount of nickel and iron that will result in the formation of the product $NiFe_2O_4$. It is more preferred that stoichiometric amounts be used. Non-limiting examples of water soluble nickel and iron salts that are suitable for us in the present invention include the nitrates, sulfates and chlorates. Preferred are the chlorates. The most preferred nickel salt is $NiCl_2.6H_2O$ and the most preferred iron salt is $FeCl_2.4H_2O$. The first fraction containing the metal salt solution is mixed with sufficient energy, preferably by sonication, for an effective amount of time, preferably from about 5 to 20 minutes, more preferably from about 10 to 15 minutes, to result in the formation of myriad aqueous microdomains, or reverse micelles, comprised of surfactant shells having an aqueous core in a continuous non-polar solvent phase, thus forming a metal salt microemulsion. That is, the reverse micelles now contain water in their interior into with the nickel/iron salt solution has diffused.

An aqueous solution containing an effective amount of a suitable precipitating agent, preferably ammonium hydroxide, is added to the second fraction. This second fraction will also be agitated, preferably with the use of sonication, for an effective amount of time, preferably from about 5 to 20 minutes, more preferably from about 10 to 15 minutes. The aqueous precipitating agent solution will become the core of the reverse micelle with a surfactant shell, thus forming a precipitating agent microemulsion.

The maximum amount of the surfactant and water comprising the two fractions is preferably up to about 50%, more preferably up to 30%, and most preferably up to about 20%, by weight of the total weight of the reverse micelle or reverse microemulsion systems. The amount of co-surfactant is preferably up to about 75%, and more preferably up to about 50%, and most preferably up to about 25%, by weight based on the total weight of the reverse micelle or reverse microemulsion systems.

At least a portion of each of the two microemulsions are combined with sufficient agitation wherein metal hydroxides are precipitated in the core water pools of the reverse micelles and oxidized to form nickel ferrite ($NiFe_2O_4$) nanoparticles.

Although not preferred, it is within the scope of this invention that the reverse micelle microemulsion not be divided into a first fraction and a second fraction, but that the aqueous metal salt solutions and the aqueous precipitating agent solution both be added, either in sequence, or simultaneously, into the initial reverse micelle microemulsion. It is preferred to divide the reverse micelle microemulsion into two fractions because it enables better control over more uniform size distribution and spherical shape of the resulting product titania coated nickel ferrite nanoparticles.

A suitable water-soluble titanium salt is added to an aqueous acidic solution. The preferred water soluble titanium salt is $TiCl_4$ and the preferred aqueous acidic solution is HCl. Preferably, the acid solution will have a pH from about 0 to 3. Acidic hydrolysis of $TiCl_4$ will occur, thus forming $TiOCl_2$. At least a fraction of this $TiOCl_2$ solution is added to the microemulsion containing the reverse micelle nickel ferrite nanoparticles, which is then heated to a temperature from about 50° C. to about 95° C., preferably from a temperature of about 80° C. to about 90° C. for an effective amount of time. This amount of time will be from about 30 to 90 minutes, preferably from about 45 to 75 minutes. It will be understood that an upper temperature at which the surfactant will decompose is undesirable. The microemulsion is subjected to sufficient mixing, preferably by use of sonication, during heating. During this step, titania will form a shell, or coating, around the nickel ferrite nanoparticles, thus producing the product composite nanoparticles of the present invention.

The resulting nanoparticles are extracted by use of a suitable alcohol. Suitable alcohols for use in the present invention are those having from about 2 to about 5 carbon atoms, preferably from about 3 to about 4 carbon atoms. The most preferred alcohol is isopropanol. An effective amount of the higher alcohol is added to the product microemulsion to form a two phase system, one phase being the higher alcohol phase and the other phase being the non-polar solvent phase. The composite nanoparticle-containing reverse micelles will migrate into the higher chain alcohol phase. The non-polar solvent phase is then physically separated, such as by decanting, from the higher alcohol phase. The higher alcohol phase, that now contains the titania/nickel ferrite nanoparticles in colloidal suspension is subjected to centrifugation for an effective amount of time to cause the composite nanoparticles to separate from the liquid phase. Any remaining surfactant can be removed by sequentially washing with isopropanol, then with water until substantially all surfactant and any remaining water soluble contaminants are removed.

The present invention will be better understood with reference to the following examples.

EXAMPLES

Synthesis of $TiO_2$ Coated $NiFe_2O_4$ Nanoparticles

A reverse micelle microemulsion system containing 108 ml of isooctane and 24 g of surfactant diiso-octylsulphoccinate (AOT) was prepared, which was subsequently divided into two substantially equal fractions (i.e., 66 ml of 0.50 M AOT-isooctane each) To the first fraction there was added 0.275 g of $FeCl_2.4H_2O$ and 0.164 g $NiCl_2.6H_2O$ dissolved in 8 ml of water and sonicated for 10 minutes. To the second fraction there was added 2 ml of 30% $NH_4OH$+2.4 ml of water and sonicated for 10 minutes. The two fractions were combined and subjected to rapid mechanical stirring for about 75 minutes resulting in the precipitation of metal hydroxides within the water pools of the reverse micelles. These metal hydroxides were nickel ferrite. The precipitation of $NiFe_2O_4$ occurred according to the following reaction:

$NiCl_2.6H_2O+2FeCl_2.4H_2O+6NH_4OH+½O_2 \rightarrow NiFe_2O_4\downarrow+6NH_4Cl+17H_2O$ After the formation of nanocrystalline nickel ferrite in the reverse micelles of the microemulsion, 0.08 ml of $TiCl_4$ was added to an HCL solution. and it is believed that the following reaction occurred.

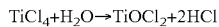

The above reaction was facilitated by the siphoning of 0.08 ml of $TiCl_4$ from its vessel, while argon gas was simultaneously introduced into the vessel to prevent direct contact of $TiCl_4$ with air. Subsequently, $TiCl_4$ was added to the deionized water in the presence of HCl (0.2 ml) such that the molar ratio was 1:1 in the product composite $TiO_2$:$NiFe_2O_4$ system. The HCl acts as a hydrolyzing agent. The acidic $TiOCl_2$ solution was added to the $NiFe_2O_4$ containing microemulsion. This was followed by heat treating the $NiFe_2O_4$ microemulsion containing acidic titanium salt solution to precipitate titania onto the surface of nanocrystalline nickel ferrite particles. The separation of solid product was accomplished by centrifuging at a speed of 15000 rpm. The resulting solid product was washed repeatedly, first with isopropanol and then with distilled water, and dried in an oven at 90° C. for 30 minutes.

Structural and Magnetic Characterization

The product $TiO_2$ coated $NiFe_2O_4$ nanoparticles were characterized by transmission electron microscopy and X-ray diffraction technique. X-ray studies were carried out using CuKα radiation of wavelength λ=0.1540 mm. The magnetic properties were examined by Superconducting Quantum Interference Device (SQUID) Magnetometer in terms of the effect of temperature on magnetization and applied field on magnetization. Two methods for magnetization measurements were used, zero-field-cooling (ZFC) and field cooling (FC). In ZFC measurements, the sample was first cooled down to 2° K without applied magnetic field and then the magnetization of the sample was measured from 2° to 300° K in the applied magnetic field. In the FC magnetization measurement, the sample was cooled to 2° K with applied magnetic field and then the measurement of magnetic moments was carried out.

Magnetic properties of $TiO_2$ coated $NiFe_2O_4$ nanoparticles and uncoated $NiFe_2O_4$ nanoparticles obtained by the reverse micelle process is presented in Table 1 below. The magnetization values observed from the ZFC/FC plots for the $TiO_2$ coated $NiFe_2O_4$ nanoparticles were slightly lower than of the uncoated $NiFe_2O_4$ nanoparticles. The lower value of magnetization is attributed to the presence of $TiO_2$ layer (non-magnetic) on the surface of $NiFe_2O_4$ particles. This is because of the contribution of the volume of the non-magnetic coating layer to the total sample volume. Additionally, the non-magnetic coating layer can be envisaged as a magnetic dead layer on the surface, thus affecting the magnitude of magnetization due to quenching of the surface moment.

TABLE 1

A comparison of magnetic properties of uncoated $NiFe_2O_4$ and $TiO_2$ coated $NiFe_2O_4$ nanoparticles.

| Sample | $T_{max}$ (K) | $T_{irr}$ (K) | Saturation Magnetization (emu/g) | | Coercivity 2° K (kOe) | Remanence 2° K (emu/g) |
|---|---|---|---|---|---|---|
| | | | 2° K | 300° K | | |
| $NiFe_2O_4$ | 16.0 | 40.0 | 35.5 | 25.4 | 0.40 | 8.8 |
| $TiO_2$ coated $NiFe_2O_4$ | 8.0 | 18.0 | 15.5 | 3.8 | 0.55 | 1.3 |

Photocatalytic Activity

The photocatalytic activity was determined by pursuing oxidation of methyl p-tolyl sulphide and degradation of methyl-orange dye. This was carried out in a Rayonet photochemical reactor (Model RPR-100, 2003), equipped with of 5 UV lamps (300-350 nm).

Oxidation of Methyl p-Tolyl Sulphide

A pyrex Fisher-Porter bottle was charged with methyl p-tolyl sulphide (0.6 ml), catalyst ($TiO_2$-coated $NiFe_2O_4$ nanoparticles) (0.18 g), and ethanol (40 ml) and stirred using a magnetic stirrer. A head (with attached gauge, inlet valve and pressure release valve) was attached. The vessel was pressurized to 40 psi of oxygen and then irradiated while stirring in Rayonet photoreactor with 300-350 nm lamp (16× 14 watts) for 20 h. The sample was analyzed by gas chromatograph-mass spectrometer (GC-MS) on a HP 5890/5972 series II equipped with SPB-5 capillary column.

Degradation of Methyl-Orange Dye

A cylindrical 250 ml pyrex bottle consisting of three sections was used. The first upper section allowed inlet and outlet gases, while the second and third section enabled sampling and temperature measurement, respectively. The reaction suspension consisted of 0.001 g methyl orange (initial concentration 0.008 g/l), 0.1 g catalyst ($TiO_2$-coated $NiFe_2O_4$ nanoparticles), and 125 ml deionized water. The photocatalytic degradation was carried out at room temperature. The pyrex bottle was placed in a Rayonet photoreactor having a 300-350 nm lamp (16×14 watts). The resulting aqueous suspension containing the methyl-orange and the catalyst powder was stirred and saturated by bubbling oxygen at atmospheric pressure with the lamp switched off. After about 20 minutes, the lamp was switched on for the initiation of reaction. During the reaction process, oxygen was continuously bubbled so that a steady state was maintained and the concentration of dissolved oxygen did not change. Samples for analyses (~4 ml) were taken at fixed time intervals and filtered to separate the catalyst. An UV spectrophotometer (JASCO, V550) was used to detect the concentration of methyl orange.

Figure 2:
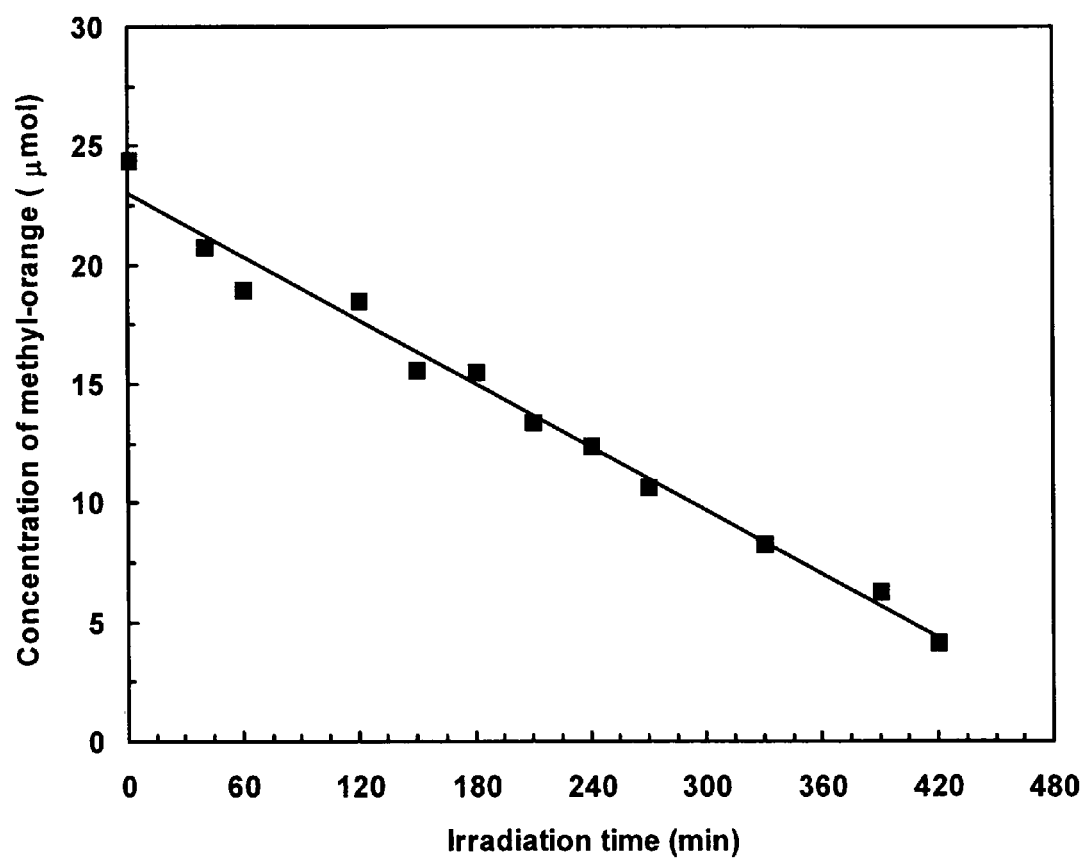
FIG. 2 hereof shows the performance of $TiO_2$ coated $NiFe_2O_4$ nanoparticles of the present invention for the photocatalytic degradation of methyl-orange.

The performance of the $TiO_2$ coated $NiFe_2O_4$ nanoparticles of the present invention for the photocatalytic degradation of methyl-orange is presented in FIG. 2 hereof. From FIG. 2 it can be seen that the methyl-orange concentrations are inversely proportional to the reaction time and the concentration was decreased from ~25 to ~4 μmol on irradiation for 7 hours (h).

Anti-Microbial Activity of Titania Coated Nickel Ferrite

Preparation of Bacterial Culture

*E. coli* k-12 (ATCC 29181) bacteria were grown in a 100 ml conical flasks containing 10 ml of Luria Bertani Broth at 37° C. on a rotatory shaker for 20 h. The speed of the shaker was set at 200 rpm. To provide fresh culture for the following experiments, aliquots of 10 μl *E. coli* culture were transferred to a test tube containing 10 ml of Luria Bertani Broth. The cell concentration was determined by a viable count procedure on Luria-Bertani Agar plates after serial dilutions of the culture in Luria Bertani Broth.

Photochemical Reactivity

To study the photochemical reactivity of $TiO_2$-coated $NiFe_2O_4$, an aqueous $TiO_2$-coated $NiFe_2O_4$ nanoparticle suspension (1 mg/ml in sterilized water) was prepared. 10 μl of *E. coli* cells (~$10^8$ cfu/ml) were suspended in 1 ml Luria Bertani Broth solution. Aliquots of 1 ml aqueous $TiO_2$ coated $NiFe_2O_4$ nanoparticle suspension were added to 4 ml quartz cubic cell containing 1 ml of sterilized water and 1 ml solution of *E. coli* bacteria containing Luria Bertani Broth. The $TiO_2$ coated $NiFe_2O_4$ nanoparticle—*E. coli* cell slurry was placed in the UV spectrophotometer chamber (JASCO, V550). The solution was irradiated with 270 nm wavelength light for different periods of time. The same procedure was conducted in the absence of $TiO_2$ coated $NiFe_2O_4$ nanoparticles.

Cell Viability Assay

The $TiO_2$-coated $NiFe_2O_4$ nanoparticle-*E. coli* cell slurry was exposed to UV light and solutions were taken out after different periods of irradiation time. Similar experiment were also performed in the absence of $TiO_2$-coated $NiFe_2O_4$ nanoparticles to determine the effectiveness of UV light, since UV light is also known to kill bacteria. After exposure to UV light, the loss of viability was examined by the viable count procedure on Luria-Bertani Agar plates after serial dilutions of the irradiated solutions (in the presence and absence of $TiO_2$ coated $NiFe_2O_4$ nanoparticles) in Luria Bertani Broth. All the plates were incubated at 37° C. for 24 h prior to enumeration.

Figure 3:
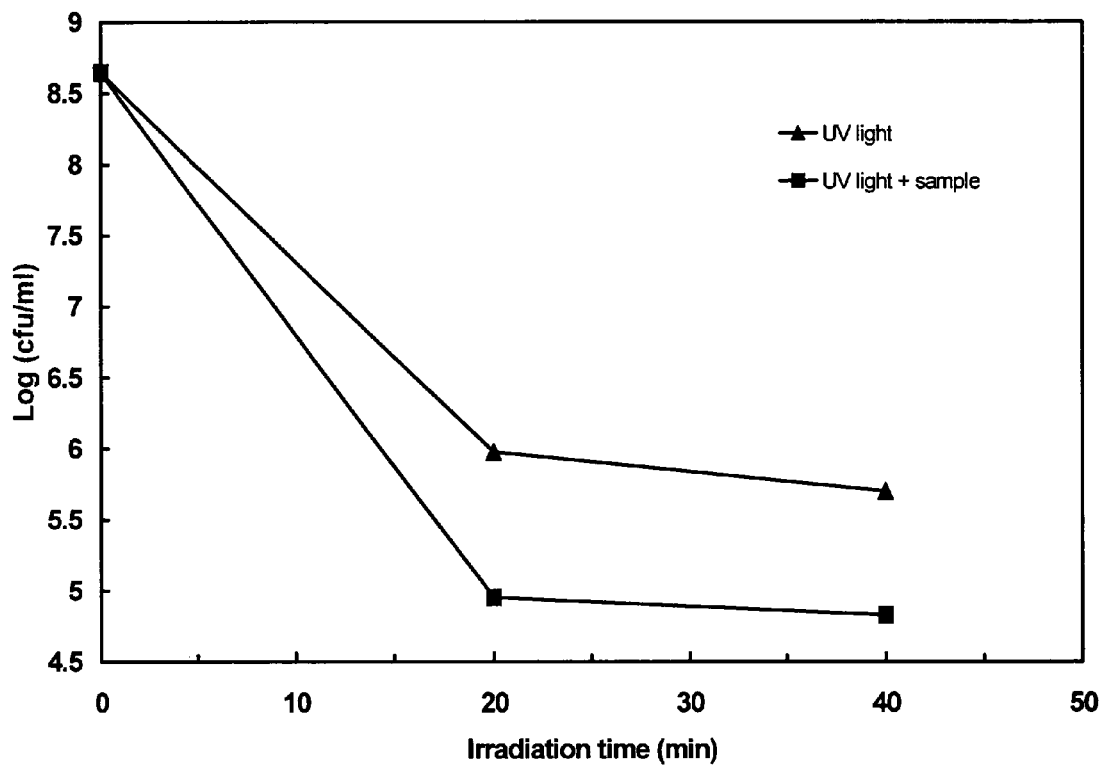
FIG. 3 hereof shows the direct germicidal action with UV light of E. coli k-12 (ATCC 29181) bacteria in the presence of $TiO_2$ coated $NiFe_2O_4$ nanoparticles of the present invention.

The bacterial inactivation by UV light occurs in the presence or absence of $TiO_2$ coated $NiFe_2O_4$ nanoparticles. However, direct germicidal action with UV light in the presence of $TiO_2$ coated $NiFe_2O_4$ nanoparticles presented in FIG. 3 hereof is enhanced. Irradiation of the bacteria *E. coli* k-12 (ATCC 29181) in the absence of the photocatalyst ($TiO_2$-coated $NiFe_2O_4$ nanoparticles) resulted in decrease of bacteria within the first 20 minutes of irradiation. However, there was higher decrease in the concentration of bacteria in the presence of $TiO_2$-coated $NiFe_2O_4$ nanoparticles. The difference between the treatments was maintained when the duration of the irradiation was exposed to 40 minutes.

Structural Characterization of $TiO_2$ Coated Nanocrystalline $NiFe_2O_4$

Representative TEM micrographs of $TiO_2$ coated $NiFe_2O_4$ nanoparticles showed that the nanoparticles were substantially uniformly spherical and had average particle size in the range of 10-20 nm. The nanoparticles also had a tendency towards a self-assembly microstructure.

FIG. 1 hereof is an electron diffraction pattern obtained from a sample of the $TiO_2/NiFe_2O_4$ composite nanoparticles of the present invention. The diffraction pattern consists of four resolved concentric rings. The symbols F and T relate to ferrite and titania, respectively. The (311) and (440) reflections correspond to spinel nickel ferrite, while (101) and (103) reflections correspond to anatase titania. The d-values obtained from the diffraction pattern for nickel ferrite and titania (nickel ferrite: d=0.2534 nm for (311) and d=0.1471 nm for (440) reflections; anatase titania: d=0.3520 nm for (101) and d=0.2347 nm for (103) reflections) compared well with the d-values measured from the X-ray diffraction data.

A summary of the X-ray diffraction data for the $TiO_2$ coated $NiFe_2O_4$ nanoparticles ($TiO_2$ and $NiFe_2O_4$ contents are 1:1 molar ratio) is presented in Table 2 below. In Table 2, comparison is made between the X-ray diffraction peak positions obtained for $TiO_2$ coated $NiFe_2O_4$ nanoparticles and those of the standard $NiFe_2O_4$ and anatase-phase of $TiO_2$. The experimentally observed peaks were consistent with nickel ferrite and anatase titanium oxide.

TABLE 2

A comparison of experimental and standard interplanar spacing (d) values with their respective (h k l) planes in TiO$_2$ coated NiFe$_2$O$_4$ nanoparticles (TiO$_2$ and NiFe$_2$O$_4$ contents are 1:1 molar ratio).

| Phase | d (nm) Experimental | d (nm) Standard[34] | Diffraction plane (h k l) | | |
|---|---|---|---|---|---|
| NiFe$_2$O$_4$ (cubic spinel) | 0.2945 | 0.2950 | 2 | 2 | 0 |
|  | 0.2520 | 0.2510 | 3 | 1 | 1 |
|  | 0.2055 | 0.2080 | 4 | 0 | 0 |
|  | 0.1450 | 0.1480 | 4 | 4 | 0 |
|  | 0.1235 | 0.1270 | 5 | 3 | 3 |
| TiO$_2$ (anatase phase, tetragonal) | 0.3520 | 0.3520 | 1 | 0 | 1 |
|  | 0.2374 | 0.2370 | 1 | 0 | 3 |
|  | 0.1450 | 0.1480 | 2 | 1 | 3 |
|  | 0.1235 | 0.1260 | 1 | 0 | 7 |

What is claimed is:

1. A method for producing composite nanoparticles comprised of a nickel ferrite core surrounded with an outer layer of titania, which method comprises:
   a) dissolving an effective amount of a surfactant into a non-polar organic solvent and providing sufficient mixing to cause the formation of a reverse micelle microemulsion;
   b) dividing said reverse micelle microemulsion into a first fraction and a second fraction;
   c) blending into said first fraction an aqueous solution having dissolved therein: i) a water soluble nickel salt; and ii) a water soluble iron salt, wherein the concentration of nickel salt and the concentration of iron salt are in at least stoichiometric amounts that will result in the formation of NiFe$_2$O$_4$, thereby forming a metal salt microemulsion comprised of reverse micelles in a continuous non-polar organic phase, which reverse micelles are comprised of an aqueous core of metal salt solution encased in a surfactant shell;
   d) blending into said second fraction an effective amount of an aqueous precipitating agent solution, thereby resulting in the formation of a precipitating agent microemulsion comprised of reverse micelles in a continuous non-polar organic phase, which reverse micelles are comprised of an aqueous core of precipitating agent solution encased in a surfactant shell;
   e) blending at least a portion of the metal salt microemulsion with at least a portion of the precipitating agent microemulsion; thereby resulting in the precipitation of particles of NiFe$_2$O$_4$ in the aqueous core of said reverse micelles and the formation of a NiFe$_2$O$_4$ reverse micelle microemulsion;
   f) introducing into said NiFe$_2$O$_4$ reverse micelle microemulsion an effective amount of an acidic titanium salt solution;
   g) heating said NiFe$_2$O$_4$ reverse micelle microemulsion solution of step f) above at an effective temperature for an effective amount of time to form composite nanoparticles comprised of an inner core of NiFe$_2$O$_4$ having an outer layer comprised substantially of TiO$_2$;
   h) extracting the composite nanoparticles by adding an effective amount of a higher alcohol to cause the nanoparticles to transfer to the higher alcohol phase and cause a colloidal dispersion;
   i) separating the colloidal dispersion alcohol phase from the non-polar solvent phase;
   j) centrifuging the colloidal dispersion of i) above to cause the composite nanoparticles to separate out of the colloidal dispersion; and
   k) collecting the composite nanoparticle product.

2. The method of claim 1 wherein the surfactant is an anionic surfactant.

3. The method of claim 2 wherein the anionic surfactant is selected from the group consisting of sodium-bis(2-ethylhexyl)sulfosuccinate, di(1,3-dimethyl-butyl)-sulfosuccinate, and diamylsulfo-succinate.

4. The method of claim 3 wherein the surfactant is sodium-bis(2-ethylhexyl)sulfosuccinate.

5. The method of claim 1 wherein the non-polar solvent is selected from the group consisting of benzene, alkylbenzenes, alkanes, chlorinated alkanes, and cycloalkanes, wherein the carbon number of said non-polar solvents does not exceed 20.

6. The method of claim 5 wherein the non-polar solvent is an alkane.

7. The method of claim 6 wherein the non-polar solvent is selected from the group consisting of hexane, octane, isooctane, decane, dodecane, hexadecane and mixtures thereof.

8. The method of claim 7 wherein the non-polar solvent is isooctane and the surfactant is sodium-bis(2-ethylhexyl)sulfosuccinate.

9. The method of claim 1 wherein the precipitating agent is ammonium hydroxide.

10. The method of claim 1 wherein the titanium salt of the acidic titanium salt solution is TiCl$_4$ and the acid is HCl.

11. The method of claim 1 wherein the titania is in the anatase form.

12. A method for producing composite nanoparticles comprised of a nickel ferrite core surrounded with an outer layer of titania, which method comprises:
   a) dissolving an effective amount of a surfactant into a non-polar organic solvent and providing sufficient mixing to cause the formation of a reverse micelle microemulsion;
   b) blending into said reverse micelle microemulsion a first aqueous solution having dissolved therein: i) a water soluble nickel salt; and ii) a water soluble iron salt, wherein the concentration of nickel salt and the concentration of iron salt are in at least stoichiometric amounts that will result in the formation of NiFe$_2$O$_4$; and a second aqueous solution containing a precipitating agent, thereby creating an aqueous core within the reverse micelles and resulting in the precipitation of particles of NiFe$_2$O$_4$ in the aqueous core of said reverse micelles and the formation of a NiFe$_2$O$_4$ reverse micelle microemulsion;
   c) introducing into said NiFe$_2$O$_4$ reverse micelle microemulsion an effective amount of an acidic titanium salt solution;
   d) heating said NiFe$_2$O$_4$ reverse micelle microemulsion solution of step f) above at an effective temperature for an effective amount of time to form composite nanoparticles comprised of an inner core of NiFe$_2$O$_4$ having an outer layer comprised substantially of TiO$_2$;
   e) extracting the composite nanoparticles by adding an effective amount of a higher alcohol to cause the nanoparticles to transfer to the higher alcohol phase and cause a colloidal dispersion;
   f) separating the colloidal dispersion alcohol phase from the non-polar solvent phase;
   g) centrifuging the colloidal dispersion of f) above to cause the composite nanoparticles to separate out of the colloidal dispersion; and
   h) collecting the composite nanoparticle product.

13. The method of claim 12 wherein the surfactant is an anionic surfactant.

14. The method of claim 13 wherein the anionic surfactant is selected from the group consisting of sodium-bis(2-ethylhexyl)sulfosuccinate, di(1,3-dimethyl-butyl)-sulfosuccinate, and diamylsulfo-succinate.

15. The method of claim 14 wherein the surfactant is sodium-bis(2-ethylhexyl)sulfosuccinate.

16. The method of claim 12 wherein the non-polar solvent is selected from the group consisting of benzene, alkylbenzenes, alkanes, chlorinated alkanes, and cycloalkanes, wherein the carbon number of said non-polar solvents does not exceed 20.

17. The method of claim 16 wherein the non-polar solvent is an alkane.

18. The method of claim 17 wherein the non-polar solvent is selected from the group consisting of hexane, octane, isooctane, decane, dodecane, hexadecane and mixtures thereof.

19. The method of claim 18 wherein the non-polar solvent is isooctane and the surfactant is sodium-bis(2-ethylhexyl)sulfosuccinate.

20. The method of claim 12 wherein the precipitating agent is ammonium hydroxide.

21. The method of claim 12 wherein the titanium salt of the acidic titanium salt solution is $TiCl_4$ and the acid is HCl.

22. The method of claim 12 wherein the titania is in the anatase form.

* * * * *